United States Patent [19]

Duclaux et al.

[11] Patent Number: 5,536,484
[45] Date of Patent: Jul. 16, 1996

[54] PRODUCTION OF AQUEOUS SOLUTIONS OF FLUOBORIC ACID

[75] Inventors: Jacky Duclaux, Eyzin-Pinet; Christian Pralus, Saint Cyr Au Mont D'Or, both of France

[73] Assignee: Elf Atochem S.A., Puteaux, France

[21] Appl. No.: 541,150

[22] Filed: Oct. 11, 1995

[30] Foreign Application Priority Data

Oct. 11, 1994 [FR] France .................................. 94 12114

[51] Int. Cl.$^6$ ...................................................... C01B 35/00
[52] U.S. Cl. ................................................................ 423/276
[58] Field of Search ................................................ 423/276

[56] References Cited

U.S. PATENT DOCUMENTS

| 2,403,148 | 7/1946 | White | 423/276 |
| 2,502,337 | 3/1950 | Moir | 423/276 |
| 2,799,559 | 7/1957 | Sullivan et al. | 423/276 |
| 3,920,825 | 11/1975 | Becher et al. | 423/276 |
| 4,061,723 | 12/1977 | Feser et al. | 423/276 |

FOREIGN PATENT DOCUMENTS

| 0364815 | 4/1990 | European Pat. Off. . | |
| 1186281 | 8/1959 | France . | |
| 1045992 | 9/1956 | Germany | 423/276 |

OTHER PUBLICATIONS

Chemical Abstracts, vol. 100, No. 18, 30 Apr. 1984, abstract No. 141594s, p. 137.

Primary Examiner—Wayne Langel
Attorney, Agent, or Firm—Spencer & Frank

[57] ABSTRACT

The invention relates to the production of colorless aqueous solutions of fluoboric acid from colored effluents of boron trifluoride hydrate. The process essentially consists of treating the colored effluent with an aqueous solution of HF, and then placing the solution obtained in contact with an activated carbon.

4 Claims, No Drawings

PRODUCTION OF AQUEOUS SOLUTIONS OF FLUOBORIC ACID

FIELD OF THE INVENTION

The present invention relates to the field of boron trifluoride and fluoboric acid, and more particularly to the conversion of industrial effluents of boron trifluoride hydrate to aqueous solutions of fluoboric acid.

BACKGROUND OF THE INVENTION

Boron trifluoride is mainly used in industry as a catalyst for many reactions, including polymerization, esterification, alkylation and isomerization, and particularly as a catalyst for the polymerization of olefins. To avoid fluoborate releases, the spent boron trifluoride is generally recovered at the reaction outlet, in the form of solutions of $BF_3$ hydrate, obtained, on the one hand, by contacting $BF_3$ with water, and, on the other, by washing with water the organic compounds formed in the reaction catalysed by $BF_3$ and which, due to the presence of various inorganic and organic impurities, are generally colored to different degrees, with their organic carbon content ranging from a few ppm to a few hundred ppm.

Heretofore these aqueous solutions were either discharged into the river after dilution, or subjected to costly treatments to convert them to products that are harmless to the environment, or to recover and purify the $BF_3$ for its recycling. Such treatments are described, for example, in patents JP 52/68754, JP 53/96260, JP 56/166987, EP 364 815, U.S. Pat. No. 4,911,758 and U.S. Pat. No. 4,981,578.

Furthermore, fluoboric acid is a valuable commercial product, used particularly as an intermediate in the production of fluoborates, in the electrolytic polishing of aluminium, in surface treatment (pickling) and in the treatment of printed circuits. It is generally marketed in the form of aqueous solutions. The specifications required by end-users impose an $HBF_4$ content of at least 49% by weight, a boric acid content ($H_3BO_3$) of between 0.1 and 8% by weight, and the absence of any color.

DESCRIPTION OF THE INVENTION

A process has now been found making it possible to treat colored aqueous effluents of $BF_3$ hydrate to produce aqueous solutions of fluoboric acid meeting commercial specifications. This process is particularly advantageous because a high value-added product is obtained, while resolving an environmental problem.

The invention therefore relates to a process for the production of an aqueous solution of fluoboric acid from a colored aqueous effluent of boron trifluoride hydrate, characterized in that:

(a) a sufficient quantity of an aqueous solution of hydrofluoric acid is added to the effluent to convert the boron trifluoride completely to fluoboric acid, (b) water and a sufficient quantity of boric acid are then added to the solution obtained to neutralize any excess of hydrofluoric acid and to obtain a boric acid content of between 0.1 and 8% by weight, and a fluoboric acid content exceeding 49% by weight, (c) the solution obtained is then contacted with an activated carbon in a sufficient quantity and during a sufficient time interval to adjust the organic carbon content of the solution to 30 ppm or less, and (d) the activated carbon is separated from the colorless solution of fluoboric acid.

The $BF_3$ content of the effluents to be treated may vary in wide proportions (47 to 65.3% by weight). Since the $HBF_4$ concentration of the final solution of fluoboric acid is directly related to the $BF_3$ content of the effluent to be treated, said effluent may be subjected to a previous step of concentration by vacuum distillation of the solutions of $BF_3$ hydrate.

The quantity of HF to be used in the first step, designed to convert the boron trifluoride hydrate to fluoboric acid by the reaction:

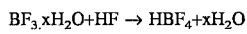

$$BF_3.xH_2O + HF \rightarrow HBF_4 + xH_2O$$

obviously depends on the $BF_3$ content of the effluent to be treated, and must be at least equal to the stoichiometric quantity corresponding to the boron content of the effluent. To make sure to obtain complete conversion of the boron present in the effluent, it is recommended to use a slight excess of HF (2 to 5% over stoichiometry).

To obtain a final solution containing over 49% by weight of fluoboric acid, the HF concentration of the aqueous hydrofluoric acid solution must be at least 70% by weight.

The HF can be added to the effluent at a temperature between 10° and 35° C., but it is preferable to operate between 20° and 30° C.

The quantity of boric acid to be used in the second step must be sufficient, on the one hand, to neutralize any excess of HF by the reaction:

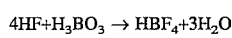

$$4HF + H_3BO_3 \rightarrow HBF_4 + 3H_2O$$

and, on the other, to adjust the $H_3BO_3$ content of the fluoboric acid solution to a value meeting commercial specifications, that is to say between 0.1 and 8% by weight, and preferably between 0.1 and 6% by weight.

Since the effectiveness of an activated carbon may vary considerably according to the type and quantity of impurities present in the aqueous solutions of $BF_3$ hydrate, it is impossible to state the precise quantity of activated carbon needed. However, for any given activated carbon, this quantity can be determined easily by a few preliminary tests, by varying the quantity of activated carbon and by measuring the carbon content of the $HBF_4$ solution treated. It has in fact been observed that the decolorization obtained is stable over time if the carbon content of the $HBF_4$ solution does not exceed 30 ppm.

Depending on the absorption capacity of the activated carbon, the contact time between the activated carbon and the fluoboric acid solution to be decolorized may range from a few minutes to a few hours.

After this placing in contact, the activated carbon can be separated by any available means, for example by settling, filtration or centrifugation.

Due to the corrosiveness of the different substances used or synthesized, all the steps of the process according to the invention must be carried out in plastic equipment (polyethylene, polypropylene, PTFE, PVDF) or equipment lined with these materials.

EXAMPLES

The following examples, which are given without implied limitation, illustrate the invention. Unless otherwise indicated, the percentages given are by weight.

EXAMPLE 1

500 g of an aqueous effluent of $BF_3$ hydrate, in the form of a pale brown liquid and having a boron content of 8.5% and a fluorine content of 44.4%, was introduced into a polypropylene container. Under stirring using a Teflon-lined magnetic stirrer, 115 g of an aqueous solution containing 71.7% of hydrofluoric acid was then added in one hour, while maintaining the temperature of the mixture between 20° and 30° C. by external cooling.

To 600 g of the solution thus obtained (614.6 g) having an $HBF_4$ content of 55% and an HF content of 1%, 55.6 g of double distilled water and 11.2 g of boric acid were then added at 20° to 25° C. in one minute, to obtain 666 g of a solution containing 50.5% of $HBF_4$ and 0.9% of $H_3BO_3$.

20 g of Acticarbone® 2S was then added to this ochre-colored solution, said Acticarbone® being an activated carbon marketed by the company CECA and exhibiting the following typical characteristics:

| molasses index | 166 |
| --- | --- |
| moisture content as packed | 2.1% |
| ash content | 3.5% |
| iodine index | 125 |
| methylene blue index | 13 |
| pH | >9 |
| BET surface area | 1150 m²/g |
| density in place in silo | 290 kg/m³ |

After stirring was continued for 30 min, the activated carbon was separated by filtration, first on a Büchner type filter of PVDF equipped with a Fyltis® fabric of polypropylene (Reference 02601 CB), and then on a Millipore filter equipped with a hydrophilic PVDF membrane (Durapore® GVWP 04700, pore size 0.22 µm).

The fluoboric acid solution thus obtained was colorless. Its carbon content, determined by a Shimadzu TOC 5000 carbon analyzer, was 23 ppm. No recolorization was observed after the addition of 7 g of a 50% aqueous solution of $H_2O_2$ to 1000 g of the $HBF_4$ solution.

The following table gives the results obtained by operating as described above with variable quantities of Acticarbone® 2S.

| quantity (g) of | characteristics of HBF₄ solution | | |
| --- | --- | --- | --- |
| Acticarbonea ® 2S per kg kg of solution | carbon content (ppm) | initial appearance | appearance after H₂O₂ addition |
| 10 | 165 | colorless | brown |
| 20 | 54 | colorless | pale yellow |
| 30 | 23 | colorless | colorless |
| 40 | 19 | colorless | colorless |
| 60 | 14 | colorless | colorless |

EXAMPLE 2

The same procedure was followed as in Example 1, using an orange-yellow effluent, having a boron content of 9% and a fluorine content of 46.4%.

For 1500 g of this effluent, the following was used:

365 g of a 71.3% aqueous HF solution, 224.4 g of double distilled water, 56.5 g of boric acid.

Before treatment with activated carbon, the fluoboric acid solution obtained assayed 51% of $HBF_4$ and 1.3% of $H_3BO_3$, and was in the form of an orange-yellow liquid.

The decolorization treatment was carried out using variable quantities of Acticarbone® 2S. The following table gives the results obtained.

| quantity (g) of Acticarbone ® 2S per kg of solution | characteristics of HBF₄ solution | | | |
| --- | --- | --- | --- | --- |
| | carbon content (ppm) | initial appearance | appearance after H₂O₂ addition | appearance after six months of storage* |
| 1.4 | 37 | colorless | very pale yellow | very pale yellow |
| 2.5 | 28 | colorless | colorless | colorless |
| 3.5 | 26 | colorless | colorless | colorless |
| 7 | 19 | colorless | colorless | colorless |
| 14 | 16 | colorless | colorless | colorless |

*Storage in light at ambient temperature, in translucent polyethylene bottles.

EXAMPLE 3 (Comparative)

1000 g of the same effluent as in Example 2 was mixed with 3.5 g of Acticarbone® 2S. After continued stirring for 30 min and separation of the activated carbon by filtration, a colorless solution was obtained having a carbon content of 44 ppm.

This colorless aqueous solution of $BF_3$ hydrate was divided into two batches, which were converted to $HBF_4$, one (batch A) immediately after decolorization, and the second (batch B) after 30 days of storage in light in a polyethylene container.

(a) Preparation of $HBF_4$ immediately after decolorization

This preparation from batch A consisted of:

the addition of 70% HF with an excess of about 5% over stoichiometry to convert all the $BF_3$ in the medium, the addition of double distilled water and boric acid to obtain an $HBF_4$ solution assaying 51% of HBF, and 1.3% of $H_3BO_3$.

The carbon content of this $HBF_4$ solution was 30 ppm. After 30 days of storage in light, the solution was very pale yellow in color.

(b) Preparation of $HBF_4$ from batch B

After 30 days of storage in light in a polyethylene container, batch B progressively recovered its yellow color. It was then converted to $HBF_4$ by proceeding as described previously for batch A. This yielded an $HBF_4$ solution with a carbon content of 30 ppm, having a pale yellow color.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Process for the production of an aqueous solution of fluoboric acid from a colored aqueous effluent of boron trifluoride hydrate, which consists in:

(a) adding to said effluent an aqueous solution of hydrofluoric acid in a sufficient quantity to convert the boron trifluoride completely to fluoboric acid, (b) then adding, to the solution obtained, water and a sufficient quantity of boric acid to neutralize any excess of hydrofluoric acid and to obtain a boric acid content ranging between 0.1 and 8% by weight and a fluoboric acid content exceeding 49% by weight, (c) then placing the solution obtained in contact with an activated carbon in a sufficient quantity and during a sufficient time interval to adjust the organic carbon content of the solution to 30 ppm or less, and (d) separating the activated carbon from the colorless solution of fluoboric acid.

2. Process according to claim 1, wherein an excess of HF is used ranging from 2 to 5% with respect to stoichiometry.

3. Process according to claim 1 wherein an aqueous solution of HF is used, having a concentration of at least 70% by weight.

4. Process according to claim 1 wherein boric acid is added in a quantity such that its content in the fluoboric acid solution is between 0.1 and 8%.

* * * * *